United States Patent

Bonner et al.

[11] Patent Number: 5,859,138
[45] Date of Patent: Jan. 12, 1999

[54] POLYMER BLENDS

[75] Inventors: James Graham Bonner, Edinburgh; Anthony Keith Powell, Linlithgow, both of Scotland

[73] Assignee: BP Chemicals Limited, London, England

[21] Appl. No.: 803,941

[22] Filed: Feb. 20, 1997

Related U.S. Application Data

[63] Continuation of PCT/GB95/01984 Aug. 21, 1995, abandoned.

[30] Foreign Application Priority Data

Aug. 26, 1994 [GB] United Kingdom ............... 9417382
May 5, 1995 [GB] United Kingdom ............... 9509166

[51] Int. Cl.⁶ ................................................. C08L 29/00
[52] U.S. Cl. ........................................ 525/185; 525/220
[58] Field of Search ................... 525/185, 220, 525/240

[56] References Cited

U.S. PATENT DOCUMENTS

| | | | |
|---|---|---|---|
| H1120 | 12/1992 | Casey. | |
| 4,709,808 | 12/1987 | Balduff et al. | 206/158 |
| 4,816,514 | 3/1989 | Lutz | 525/55 |
| 5,089,556 | 2/1992 | Tabor | 525/64 |
| 5,147,712 | 9/1992 | Miyahara | 525/185 |
| 5,395,881 | 3/1995 | Spelthann | 525/190 |
| 5,434,217 | 7/1995 | Spelthann | 525/190 |

FOREIGN PATENT DOCUMENTS

| | | |
|---|---|---|
| 090554 | 10/1983 | European Pat. Off. . |
| 230143 | 7/1987 | European Pat. Off. . |
| 0 306 115 A2 | 2/1988 | European Pat. Off. . |
| 392759 | 10/1990 | European Pat. Off. . |
| WO91/18944 | 12/1991 | WIPO . |

OTHER PUBLICATIONS

Encylcopedia of Polymer Science and Engineering, vol. 2, Anionic Polymerization to Cationic Polymerization.

*Primary Examiner*—Paul R. Michl
*Attorney, Agent, or Firm*—Fay, Sharpe, Beall, Fagan, Minnich & McKee

[57] ABSTRACT

A polymer blend comprised of a polyketone and linear low density polyethylene (LLDPE). The blend is suitable for use with foodstuffs and liquid hydrocarbons. In a preferred form of the invention, the polyketone has an alternating structure of (a) units derived from carbon monoxide and (b) units derived from one or more olefinically unsaturated compounds.

9 Claims, No Drawings

POLYMER BLENDS

This application is a continuation of International Application No. PCT/GB95/01984 filed on Aug. 21, 1995 now abandoned.

This invention relates to polymer blends comprising polyketones and polyethylene, in particular linear low density polyethylene (LLDPE).

For the purpose of this patent, polyketones are defined as linear polymers having an alternating structure of (a) units derived from carbon monoxide and (b) units derived from one or more olefinically unsaturated compounds. Although for the purposes of this patent polyketones correspond to this idealised structure, it is envisaged that materials corresponding to this structure in the main but containing small regimes (i.e. up to 10 wt %) of the corresponding homopolymer or copolymer derived from the olefinically unsaturated compound, also fall within the definition.

Such polyketones have the formula:

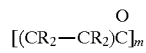 (I)

where the R groups are independently hydrogen or hydrocarbyl groups, and m is a large integer; they are disclosed in several patents e.g. U.S. Pat. No. 3,694,412. Processes for preparing the polyketones are disclosed in U.S. Pat. No. 3,694,412 and also in EP 181014 and EP 121965.

Polyketones can be used in a variety of applications including, for example, packaging. It is important in the case of polymers used in some packaging applications to improve the barrier properties of the polymer. EP 90554 to Du Pont discloses blends of polyolefins and condensation polymers with improved barrier properties. However, there is no indication in EP 90554 that the barrier properties of polyketones can be improved by blending with other polymers.

We have now found that the barrier properties (eg oxygen, water and hydrocarbon) of polyketones and LLDPE can be significantly improved by blending polyketone with LLDPE. In particular, the water vapour transmission rate in polyketones (WVTR) can be significantly reduced. Polymer blends of polyethylene and polyketone are known. In particular EP 392759 discloses the use of polyketones for enhancing the photodegradability of thermoplastic polymers including polyethylene. However, in this case the specific type of polyethylene used in the polymer blends was low density polyethylene having a density of about 0.92 g/cm$^3$. In addition there was no indication in EP 392759 that such blends would have enhanced barrier properties.

Thus according to the present invention there is provide, a polymer blend comprising a polyketone and a linear low density polyethylene.

Linear low density polyethylene (LLDPE) is a term well known in the art. LLDPE polymers are normally solid low molecular weight semi-crystalline copolymers of ethylene and one or more alpha olefin comonomer (e.g. a $C_3$ to $C_8$ alpha olefin). The density of LLDPE is typically in the range 0.91 to 0.940 g/cm$^3$, preferably 0.920 to 0.930 g/cm$^3$. The melt flow rate (2.16 kg load at 190° C.) of LLDPE is typically in the range 0.1 to 150 g/10 min preferably 1.0 to 10 for example 2 to 7. However, the preferred melt flow rate range will vary depending upon application. For example, where LLDPE is to be used for film the melt flow rate is typically in the range 0.1 to 4.0 g/10 min, preferably 0.2 to 1.0 g/10 min where it is used for pipe and sheet the melt flow rate is typically in the range 0.5 to 5 g/10 min and where it is used for injection moulding, the melt flow rate is in the range 5–150 g/10 min. The LLDPE will have a weight-average molecular weight in the range 80,000 to 200,000 preferably 110,000 and a polydispersity ratio in the range 3 to 6 preferably 4 to 5. LLDPE is a copolymer of ethylene with one or more alpha-olefins typically a $C_3$ to $C_8$ alpha olefin for example 1-butene, 1-hexene, 4-methylpentene-1 and 1-octene. The comonomer content is in the range 3 to 15% by weight preferably 6–10% by weight. The LLDPE used in the blends of polyketone and LLDPE of the present invention can be a blend of two or more different grades of LLDPE or can be a blend with other types of polyethylene.

As noted above for the purposes of this patent, polyketones are defined as linear polymers having an alternating structure of (a) units derived from carbon monoxide and (b) units derived from one or more olefinically unsaturated compounds. Suitable olefinic units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of ethylene and one or more $C_3$ to $C_6$ normal alpha-olefin(s) especially preferable materials it is further preferred that the molar ratio of ethylene units to $C_3$ to $C_6$ normal alpha-olefin units is greater than or equal to 1 most preferably between 2 and 30. Typically, the polyketone will be a terpolymer of ethylene/propylene/CO where the units derived from propylene are present in the terpolymer in the range 5–8% e.g. 6% by weight of the polymer. The Melt Flow Rate (5 kg load at 240° C.) is typically in the range 5–200, preferably 10–150, more preferably 20–100 for example 40–80 g/10 mins.

The polyketone will suitably have a number average molecular weight of between 40,000 to 500,000 preferably between 50,000 and 250,000 for example 60,000 to 150,000. A preferred polyketone is an ethylene/propylene/CO terpolymer having a number average molecular weight in the range 60,000 to 150,000.

The blends of polyketone and LLDPE can be prepared using known techniques and equipment for batch or continuous blending.

The weight ratio of polyketone to LLDPE is suitably in the range 1:10 to 10:1 preferably 1:3 to 3:1 more preferably 1:1.5 to 1.5:1 for example 1:1. However, where the water barrier properties (as measured by the water vapour transmission rate) of polyketones are to be improved, it is preferred that 1–50%, preferably 5–40% for example 30% by weight of LLDPE is added to polyketone (ie a polyketone to LLDPE ratio of 7:3). On the other hand, if the oxygen barrier and/or hydrocarbon barrier properties of LLDPE are to be improved, it is preferred that 1–50% preferably 10–40% for example 30% by weight of polyketone is added to LLDPE (ie a polyketone:LLDPE ratio of 3:7).

Other polymers may be blended with the blend composition of the present invention; the nature and amount of such a polymer will depend upon what modifications of the polymer properties are required. Furthermore the blends of the present invention may contain conventional polymer additives such as anti-oxidants, stabilisers, and mould release agents.

The blends of the present invention are particularly suitable for packaging applications, for example containers (e.g. bottles and tanks for use with food and beverages and hydrocarbon solvent) and film.

According to a further aspect of the present invention there is provided a polymer-based container suitable for use with foodstuff (food or beverages) or liquid hydrocarbons wherein the polymer comprises a blend of a polyketone and LLDPE.

Such a container may be made at least in part from a monolayer of the blend. Alternatively it could be of a multi-layer construction at least one layer of which is a blend according to the present invention. However, a mono-layer construction is preferred.

According to a further aspect of the present invention, there is provided foodstuff or liquid hydrocarbons packaged with a polymer which comprises a blend of a polyketone and LLDPE.

In another aspect of the present invention there is provided the use of a polymer comprising a blend of polyketone and LLDPE to package foodstuff or liquid hydrocarbons.

Methods of fabricating the blends into either containers, films or other applications are standard in the art, for example extrusion, coextrusion, injection moulding, blow-moulding. Preferred methods of fabricating the blends are those where orientation of the polymer is likely e.g. extrusion (film extrusion) and blow-moulding.

The invention will now be illustrated by the following Examples.

EXAMPLE 1

LLDPE (LL0209AA from BP Chemicals, density=920 kg/m$^3$, melt flow rate=0.9 g/10 mins) was blended with polyketone (an ethylene/propylene/CO terpolymer mpt 205° C.; melt flow rate 41 g/10 mins at 240° C., 5 kg) using an APV corotating twin screw extruder (screw speed 150 rpm, temperature 215° C.). The output was maintained to give a torque of 60% throughout blend production. The blends were then processed using a Plasticisers film/fibre unit; single screw extruder (screw speed 30 rpm temperature profile, 180° C. hopper, 205° C., 215° C., 215° C. die; haul-off speed 15 ft/min). The films so produced were subsequently characterised as were pellets from the APV blending stage. The Table summarises the results.

2. A polymer blend as claimed in claim 1 wherein the polyketone is an ethylene/propylene/CO terpolymer.

3. A polymer blend as claimed in claim 2 wherein the units derived from propylene are present in the terpolymer in the range 5–8% by weight of the polymer.

4. A polymer blend as claimed in claim 1 wherein the polyketone has a number average molecular weight between 60,000 and 150,000.

5. A polymer blend as claimed in claim 1 wherein the LLDPE has a density in the range 0.91 to 0.94 g/cm$^3$.

6. A polymer blend as claimed in claim 5 wherein the LLDPE has a density in the range 0.92 to 0.93 g/cm$^3$.

7. A polymer-based container suitable for use with foodstuff wherein the polymer comprises a blend of a polyketone having an alternating structure of (a) units derived from carbon monoxide and (b) units derived from one or more olefinically unsaturated compounds and LLDPE having 1 to 50% by weight of the LLDPE added to the polyketone.

8. A polymer-based container suitable for use with liquid hydrocarbons wherein the polymer comprises a blend of a polyketone having an alternating structure of (a) units derived from carbon monoxide and (b) units derived from

EPCO/LLDPE BLENDS

| % Weight LL0209 | Tangent MOD (MPa) | Yield Strength (MPa) | Fracture Stress (MPa) | Elongation to Failure (%) | Oxygen Permeability @ 23° C., 0% RH (cc · mm/m^2/day/atm) | Water Permeability @ 38° C., 100% RH (g · mm/m^2/day/atmos) |
|---|---|---|---|---|---|---|
| 0 | 787 | 31.5 | 56.9 | 414 | 0.59 | 14.1 |
| 1 | nm | nm | nm | nm | nm | |
| 2 | nm | nm | nm | nm | nm | |
| 5 | nm | 33.0 | 62.0 | 413 | nm | |
| 10 | 657 | 31.2 | 59.2 | 470 | nm | |
| 20 | 552 | 25.7 | 56.3 | 515 | nm | |
| 30 | 416 | 19.1 | 44.6 | 500 | 3.43 | 4.49 |
| 50 | 292 | 12.4 | 30.2 | 463 | 10.29 | 2.33 |
| 70 | 207 | 10.7 | 23.6 | 451 | 113.1 | 1.55 |
| 80 | 173 | 11.5 | 29.2 | 581 | nm | |
| 90 | 119 | 8.9 | 32.8 | 736 | nm | |
| 95 | 85 | 7.8 | 30.1 | 776 | nm | |
| 100 | 76 | 7.2 | 27.7 | 725 | 346.1 | 0.66 |

We claim:

1. A polymer blend comprising a polyketone having an alternating structure of (a) units derived from carbon monoxide and (b) units derived from one or more olefinically unsaturated compounds and a linear low density polyethylene (LLDPE) wherein 1 to 50% by weight of the LLDPE is added to the polyketone.

one or more olefinically unsaturated compounds and LLDPE having 1 to 50% by weight of the LLDPE added to the polyketone.

9. Foodstuff packagedd with a polymer as claimed in claim 1.

* * * * *